(12) United States Patent
Mizubata et al.

(10) Patent No.: US 7,339,654 B2
(45) Date of Patent: Mar. 4, 2008

(54) SHEET CONVEYING APPARATUS AND IMAGE READING APPARATUS

(75) Inventors: Tsuyoshi Mizubata, Tokyo (JP); Kiyoshi Hata, Tokyo (JP); Masahiko Fukushima, Tokyo (JP); Kazuhide Sano, Yamanashi-ken (JP); Masashi Yamashita, Yamanashi-ken (JP)

(73) Assignees: Konica Minolta Business Technologies, Inc. (JP); Nisca Corporation (JP)

( * ) Notice: Subject to any disclaimer, the term of this patent is extended or adjusted under 35 U.S.C. 154(b) by 239 days.

(21) Appl. No.: 11/190,275

(22) Filed: Jul. 26, 2005

(65) Prior Publication Data

US 2006/0044543 A1    Mar. 2, 2006

(30) Foreign Application Priority Data

Aug. 30, 2004    (JP)    ............................. 2004-250580

(51) Int. Cl.
*G03B 27/00*    (2006.01)

(52) U.S. Cl. .................. 355/407; 355/40; 271/3.15; 271/3.17; 271/4.02; 271/4.03; 271/10.02; 271/10.03; 271/258.01; 271/259; 271/265.01; 271/265.02

(58) Field of Classification Search ............... 271/3.15, 271/3.17, 4.02, 4.03, 10.02, 10.03, 258.01, 271/259, 265.01, 265.02; 355/40, 407
See application file for complete search history.

(56) References Cited

U.S. PATENT DOCUMENTS

| | | | |
|---|---|---|---|
| 4,814,792 A * | 3/1989 | Yamanobe et al. | 347/248 |
| 5,311,259 A * | 5/1994 | Moriya et al. | 399/86 |
| 6,145,834 A * | 11/2000 | Hirota et al. | 271/225 |
| 6,409,043 B1 * | 6/2002 | Fujita et al. | 271/10.03 |
| 6,533,263 B2 * | 3/2003 | Tamura | 271/10.01 |
| 6,648,320 B2 * | 11/2003 | Iino et al. | 271/3.15 |
| 6,651,980 B2 * | 11/2003 | Isemura et al. | 271/259 |
| 6,752,318 B2 * | 6/2004 | Ishii | 235/470 |
| 6,799,761 B2 * | 10/2004 | Kato | 271/242 |
| 6,836,640 B2 * | 12/2004 | Isemura et al. | 399/388 |

FOREIGN PATENT DOCUMENTS

| | | |
|---|---|---|
| JP | 06-092512 | 4/1994 |
| JP | 07-187449 | 7/1995 |
| JP | 2002-292960 | 10/2002 |

\* cited by examiner

*Primary Examiner*—Patrick Assouad
*Assistant Examiner*—Warren K Fenwick
(74) *Attorney, Agent, or Firm*—Squire, Sanders & Dempsey L.L.P.

(57) ABSTRACT

A sheet conveying apparatus is provided including a sheet feed tray on which sheets of a plurality of sizes are placed. A conveying unit conveys a sheet on the sheet feed tray to a predetermined processing position. A sheet position detector has a plurality of light-emitting units respectively arranged at positions corresponding to different sheet widths and one light-receiving unit capable of moving to positions corresponding to the plurality of light-emitting units. A light reception position detector which detects the position of the light-receiving unit, and a control unit which selects one of the plurality of light-emitting units can also be provided.

13 Claims, 8 Drawing Sheets

SHEET CONVEYING APPARATUS AND IMAGE READING APPARATUS

This application is based on and claims the priority under 35 U.S.C. §119 from the Japanese Patent Application No. 2004-250580 filed in Japan on Aug. 30, 2004, the entire content of which is incorporated herein by reference.

BACKGROUND OF THE INVENTION

1. Field of the Invention

The present invention relates to a sheet conveying apparatus which conveys a sheet placed on a sheet feed tray to a predetermined position and an image reading apparatus which optically reads an image on a sheet conveyed by the sheet conveying apparatus and outputs read data.

2. Description of Related Art

Conventionally, in an original conveying apparatus mounted on an image reading apparatus such as a copying machine or printer, a sheet sometimes skews to cause a lateral shift when being conveyed. As the sheet causes a lateral shift, an image formed on the sheet may tilt or shift. For this reason, in general, a lateral shift is detected by a sensor, and the shift of an image is corrected on the basis of the detection result.

In addition, when the lateral shift of a sheet is detected and the image reading position is corrected in accordance with the lateral shift amount, a light-receiving element having many pixels such as a line sensor or image sensor represented by a photodiode array, CCD sensor, CMOS sensor, or CIS sensor is generally used as a lateral shift amount detection sensor, and the lateral shift position of the sheet is detected in accordance with the ON/OFF state of each pixel (see, for example, Japanese Unexamined Patent Publication No. 6-92512: patent reference 1, Japanese Unexamined Patent Publication No. 7-187449: patent reference 2, and Japanese Unexamined Patent Publication No. 2002-292960: patent reference 3). In this case, the light-emitting side requires a light-emitting area similar to the length of the light-receiving side, and hence parallel light is formed by using an LED array, diffusion plate, lens, or slit.

A general image reading apparatus handles sheets of various sizes. As schemes of conveying such sheets of different sizes, an one-side reference convey scheme and center reference convey scheme have already been known. In the former scheme, sheets of all sizes are conveyed while one end of each sheet in the widthwise direction is aligned with a reference position set on one side of a sheet feed tray. In the latter scheme, sheets of all sizes are conveyed while the center of each sheet in the widthwise direction is aligned with the center of a sheet feed tray.

According to the one-side reference convey scheme, sheets of all sizes can be detected by placing a lateral shift amount detection sensor within a relatively short range at a position on a convey path which corresponds to the reference position provided on one side on the sheet feed tray. In contrast, according to the center reference convey scheme, since the convey positions of end portions of sheets of the respective sizes differ from each other, at least the light-receiving element of a lateral shift amount detection sensor needs to have a length corresponding to the positions of the end portions of the respective sheets in the widthwise direction. For this reason, the light-receiving element becomes long. On the other hand, the resolution of an output voltage from a current-voltage conversion circuit is uniform. As a consequence, the detection precision of the lateral shift amount of a sheet in this case is lower than that in a case wherein the light-receiving element is short (in the case of the lateral shift amount detection sensor in the one-side reference convey scheme). In addition, if almost uniform light does not strike the light-receiving element, the detection precision deteriorates. For this reason, as described above, a light-emitting area (parallel light) almost equal in length to the light-receiving element must be formed on the light-emitting side by using an LED array, diffusion plate, lens, or the like. Furthermore, as the light-receiving element becomes longer, a lager space is required, and an increase in cost occurs.

SUMMARY OF THE INVENTION

The present invention has been made in consideration of the above situation, and may provide an apparatus which can accurately detect the positional shift amounts of conveyed sheets in the widthwise direction without increasing the number of components or complicating a structure even if conveyed sheets have different sizes in the widthwise direction.

In order to achieve the above, according to an embodiment of the present invention, there is a sheet conveying apparatus including a sheet feed tray on which sheets of a plurality of sizes which differ in length in a sheet widthwise direction perpendicular to a sheet conveying direction, a conveying unit which conveys a sheet on the sheet feed tray to a predetermined processing position, a sheet position detector which has a plurality of light-emitting units respectively arranged at positions corresponding to different sheet widths and one light-receiving unit capable of moving to positions corresponding to the plurality of light-emitting units, a light reception position detector which detects a position of the light-receiving unit, and a control unit which selects one of the plurality of light-emitting units on the basis of a detection result from the light reception position detector, wherein the sheet position detector causes the selected light-emitting unit to emit light and detects a convey position of an end portion of a sheet in the widthwise direction which is conveyed by the conveying unit on the basis of an output signal from the light-receiving unit when the light-emitting unit is caused to emit light.

According to another embodiment of the present invention, there is provided a sheet conveying apparatus including a sheet feed tray on which a sheet is placed, a conveying unit which conveys a sheet on the sheet feed tray to a predetermined processing position, a sheet position detector which has a plurality of light-emitting units respectively arranged at positions corresponding to different sheet widths and one light-receiving unit capable of moving to positions corresponding to the plurality of light-emitting units, and detects a convey position of an end portion of a sheet in a widthwise direction which is conveyed by the conveying unit, and a light reception position detector which detects a position of the light-receiving unit on the basis of an output from the light-receiving unit when each of the plurality of light-emitting units is caused to emit light.

The above and many other features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

Embodiments will now be described, by way of example only, with reference to the accompanying drawings which are meant to be exemplary, not limiting, and wherein like elements are numbered alike several Figures, in which.

DETAILED DESCRIPTION OF THE PREFERRED EMBODIMENTS

The preferred embodiment of an image reading apparatus according to the present invention will be described in detail with reference to the accompanying drawings.

Figure 1:
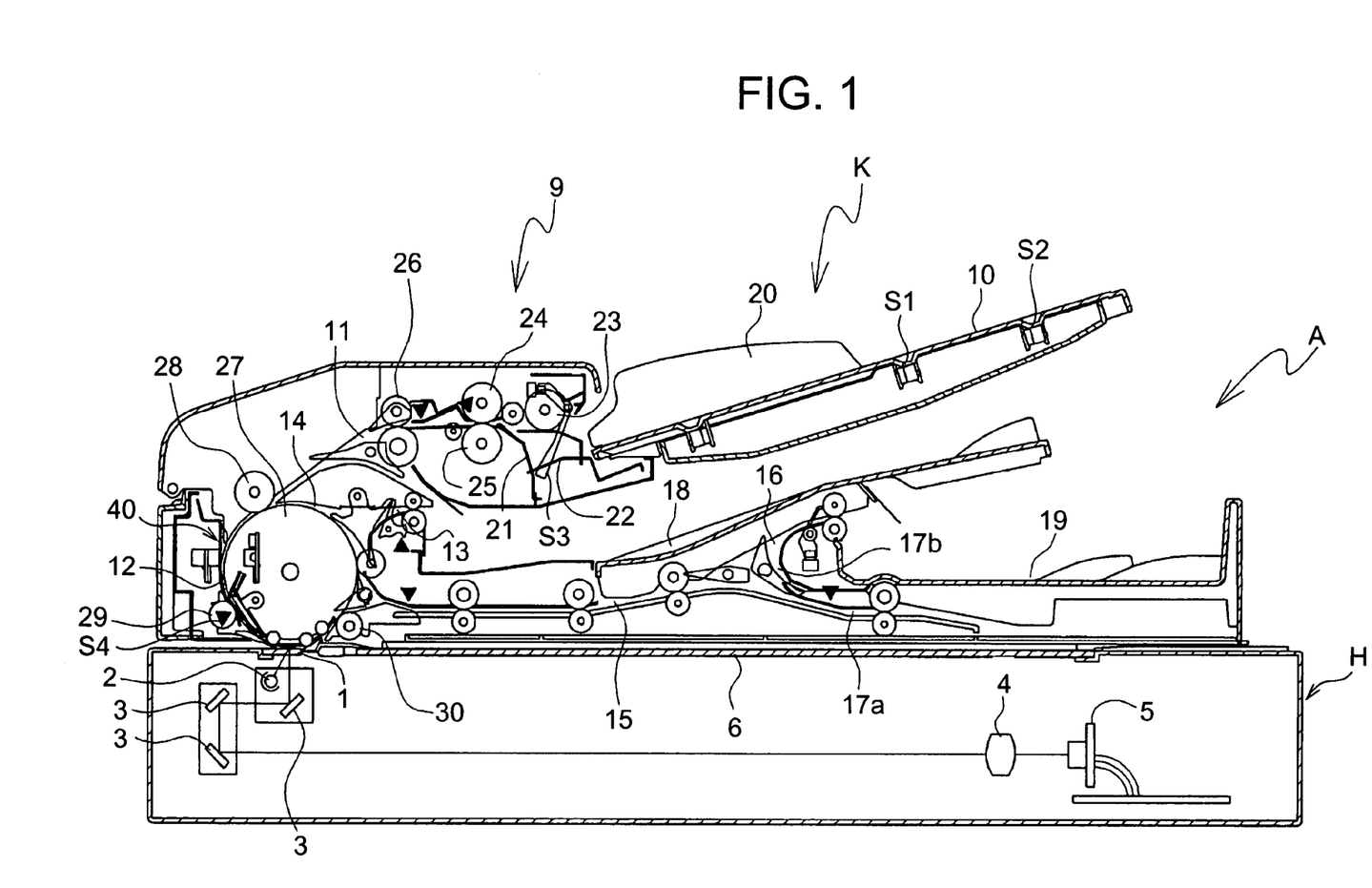
FIG. 1 is a sectional view showing the overall arrangement of a sheet image reading apparatus according to the present invention.

FIG. 1 shows the entire arrangement of an image reading apparatus according to the present invention, which includes an image reading apparatus main body H and an original feeder A mounted on it. An original picked up from a sheet feeder K of the original feeder A passes the reading position of the image reading apparatus main body H and is delivered onto a delivery tray.

The original feeder A includes the sheet feeder K having a sheet feed tray 10 for placing a plurality of originals on it, and first and second delivery trays 18 and 19 which store the originals read by the image reading apparatus main body H. The first delivery tray 18 mainly stores large-sized originals, and the second delivery tray 19 stores small-sized originals.

The original feeder A has a plurality of sheet convey paths extending from the sheet feeder K to the first and second delivery trays 18 and 19 via the image reading apparatus main body H. First, a sheet feed path 11 conveys the original picked up from the sheet feed tray 10. A convey path 12 extends from the sheet feed path 11 to a first glass platen 1 of the image reading apparatus main body H. A first delivery path 13 continues from the convey path 12 to the delivery port to the first delivery tray 18. Large-diameter convey rollers 27 and a plurality of driven rollers 28, 29, and 30 which are in tight contact with the outer surfaces of the convey rollers 27 are arranged between the convey path 12 and first delivery path 13. The convey rollers 27 are driven by a convey motor (not shown). An intermediate path 15 is formed between the convey rollers 27 and second delivery tray 19. A second delivery path 16 continues from the intermediate path 15 to the delivery port of the second delivery tray 19. A switchback path 17a branches from the second delivery path 16 to switch back the original set from the intermediate path 15. A reversal path 17b turns over the switch-backed original and guides it to the delivery port to the second delivery tray 19. A circulation path 14 returns the switch-backed original to the connecting portion of the sheet feed path 11 and convey path 12 via the intermediate path 15 and sends it to the convey path 12 again. These sheet convey paths form the original feed path.

The sheet feeder K includes the sheet feed tray 10 described above and a sheet feed device 9 for picking up the originals one by one from the sheet feed tray 10 and conveys them to the sheet feed path 11. The sheet feed tray 10 is provided with a side guide 20 which regulates the side ends of the originals placed on the sheet feed tray 10. A stopper member 21 is arranged in the vicinity of the distal end of the sheet feed tray 10 to regulate the leading edges of the originals placed on the sheet feed tray 10. The sheet feed tray 10 is attached to be pivotal about the leading edge side in the original convey direction.

The sheet feed device 9 includes a pickup roller 23, elevating plate 22, sheet feed roller 24, separation roller 25, and registration roller pair 26. The pickup roller 23 sends out the original. The elevating plate 22 lifts up the leading edges of the originals placed on the sheet feed tray 10 to bring them into contact with the pickup roller 23. The sheet feed roller 24 supplies an original picked up by the pickup roller 23. The separation roller 25 allows only the uppermost one of the originals placed on the sheet feed tray 10 to pass through, and inhibits conveyance of the second and following originals. The registration roller pair 26 aligns the supplied originals which are separated by the separation roller 25 by abutting against the leading edges of the originals, and sends them downstream.

In the image reading apparatus main body H, lamp light from a light source 2 irradiates the conveyed original through the first glass platen 1 set at the original reading position. Light reflected by the original is reflected by a plurality of mirrors 3 and photoelectrically converted by a reading device 5, e.g., a CCD, through a lens 4, to read the original image. More specifically, the upper surface of the first glass platen 1 and its vicinity form the reading portion of the image reading apparatus main body H. The image reading apparatus main body H also includes a second glass platen 6 with an area sufficiently wide to place the original on it. When the original feeder A is opened and closed to place a thick original such as a book on the second glass platen 6, a light source unit including the light source 2, mirrors 3, and the like is moved in the subscanning direction to read the original image through the second glass platen 6.

Figure 2:
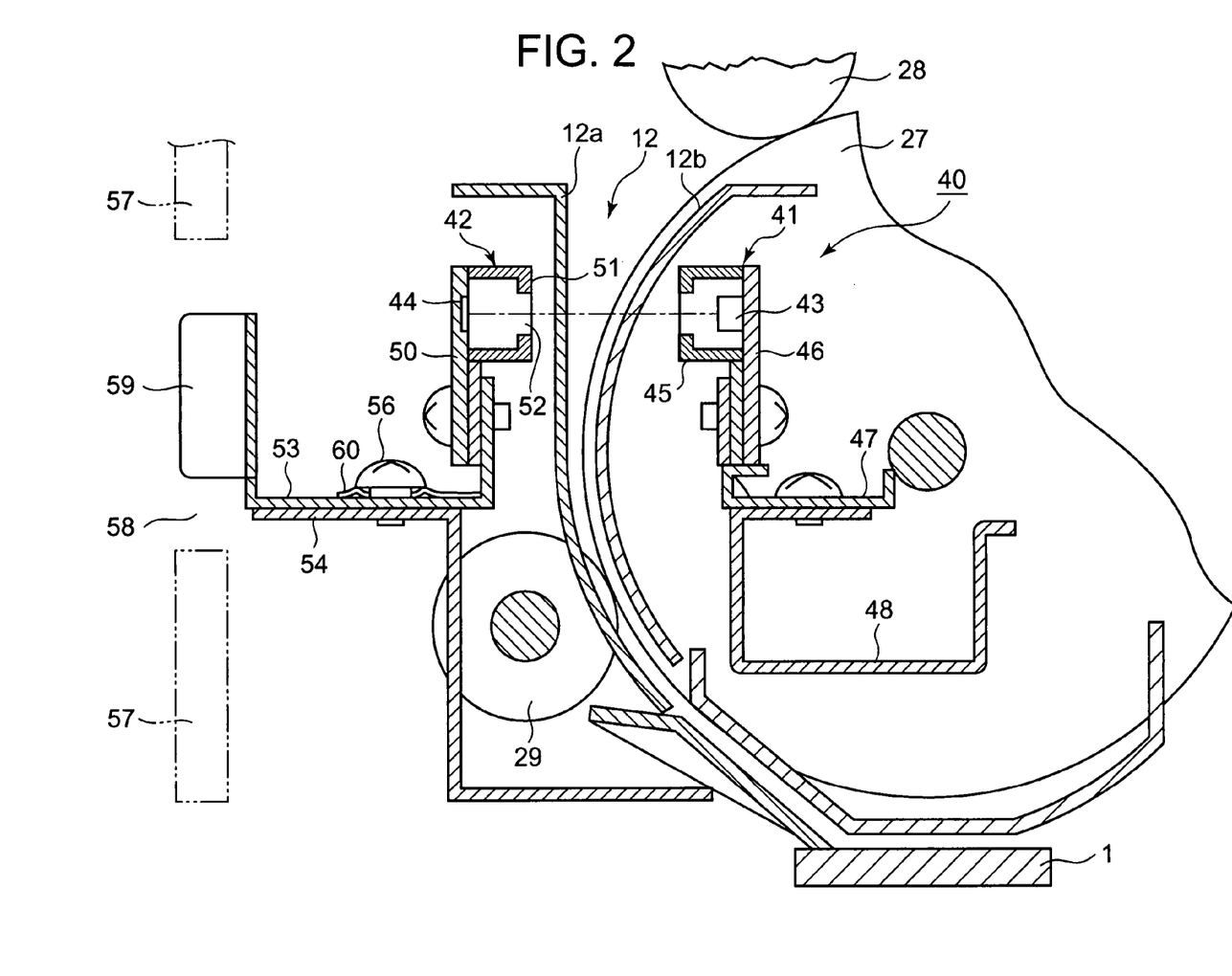
FIG. 2 is a sectional view showing the mounting structure of a photodetector in the image reading apparatus according to the present invention.

It should be noted in the present embodiment that a photodetector 40 serving as a sheet position detection unit for detecting the lateral shift amount of a conveyed sheet from the position of the end portion of the sheet is placed in a convey path 12 between driven rollers 28 and 29. As shown in FIG. 2, the photodetector 40 comprises a light-emitting unit 41 placed inside the convey path 12 and a light-receiving unit 42 placed outside the convey path 12. The light-emitting unit 41 on one side is provided with a light-emitting element 43 serving as a light-emitting unit. The light-receiving unit 42 on the other side is provided with a light-receiving element 44 serving as a light-receiving unit. In addition, the light-emitting element 43 in this embodiment is a wide-directivity LED, and a photodiode chip is used as the light-receiving element 44.

Figure 3:
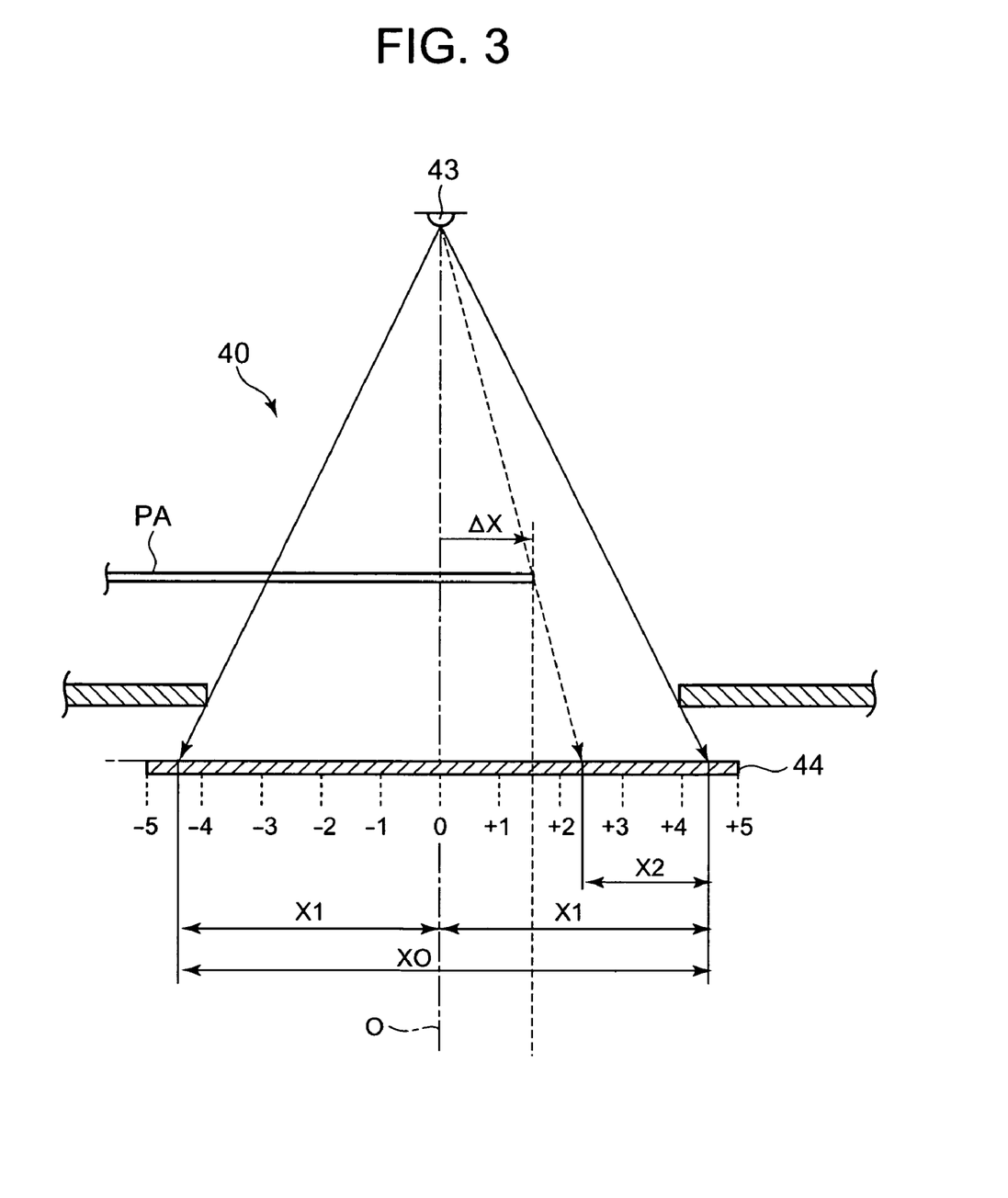
FIG. 3 is a view for explaining the principle of detection of a lateral shift amount by the photodector in the present invention.

In this arrangement, as shown in FIG. 3, the light-emitting element 43 is placed such that its optical axis O coincides with the reference position of an end portion of a passing original. A photodiode chip serving as the light-receiving element 44 is placed such that its middle in the widthwise direction coincides with the reference position of an end portion of a passing original, i.e., the optical axis O. The light-receiving element 44 detects the convey position of an original with respect to the reference position O, i.e., the shift amount with respect to the reference position O, from the light reception amount from the light-emitting element 43. That is, when an original PA is conveyed with its end portion being shifted outward from the reference position O by ΔX as shown in FIG. 3, an area X2 in FIG. 3 is an area where the light-receiving surface of the light-receiving element 44 receives light. The position of the end portion of the original can be easily detected by computing the ratio of a light reception amount L2 corresponding to the light reception area X2 to a light reception amount L0 when light is received by an entire area X0 of the light-receiving surface of the light-receiving element 44 without no original.

A light reception area X1 in a case wherein the end portion of the original passes through the convey reference O is ½ the entire light reception area X0 of the light-receiving element 44, and hence a light reception amount L1 in the light reception area X1 is ½ that in the entire light reception area X0. Therefore, the shift amount ΔX can be calculated from the value obtained by subtracting the light reception amount L2 obtained when the original is conveyed with its end portion being shifted outward by ΔX from the value ½ the light reception amount L0 when light is received in the entire light reception area X0 of the light-receiving element 44. The image data is then corrected by changing the reading position of the image data stored in a storage unit such as a RAM on the basis of the calculated shift amount. This corrected image data is transferred to an external device such as a printer or personal computer to form an image coinciding with the original image.

Note that the respective light reception amounts described above are output after being photoelectrically converted into voltages, and computation is actually executed on the basis of the output voltage values, thereby obtaining a shift amount. In the above embodiment, image data is corrected by reading image data stored in the storage unit upon changing the reading position. However, correction may be made to change the read start position in the main scanning direction of a reading unit 5.

In this case, a photodiode chip is used as the light-receiving element 44. However, a light-receiving element having many pixels, e.g., a line sensor or image sensor represented by a photodiode array, CCD sensor, CMOS sensor, or CSI sensor may be used to detect the position of the end portion of an original in accordance with the ON/OFF state of each pixel, thereby calculating the lateral shift amount of the sheet.

Figure 4A:
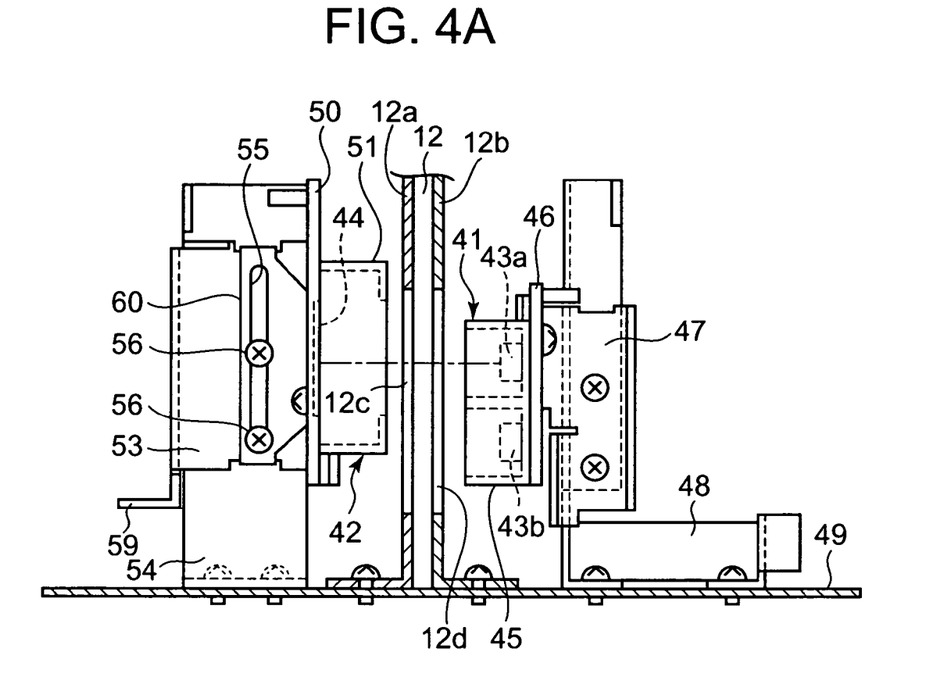
FIGS. 4A and 4B are views for explaining the sliding movement of the light-receiving unit of the photodetector.
Figure 4B:
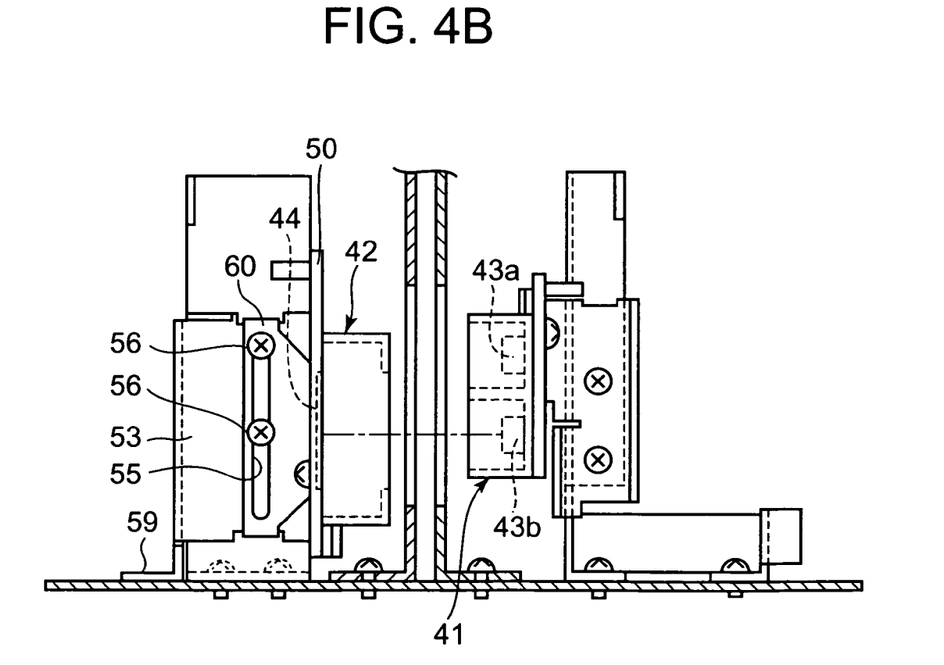

In this embodiment, as shown in FIGS. 4A and 4B, the light-emitting unit 41 comprises two light-emitting elements 43a and 43b which are respectively arranged at positions corresponding to the different sizes of two types of originals which are often used. The light-receiving unit 42 placed to face the light-emitting unit 41 through the convey path 12 can be slid so as to allow the light-receiving element 44 to correspond to the positions of the two light-emitting elements 43a and 43b of the light-emitting unit 41. In this embodiment, two light-emitting elements 43a and 43b are used, however three or more light-emitting elements may be used according to the sheet size.

The pair of light-emitting elements 43a and 43b constituting the light-emitting unit 41 are arranged in a light-shielding case 45 and are surrounded in all directions by a vertical wall to prevent the entrance of disturbance light. The light-shielding case 45 is mounted on an LED board 46 and is attached to a bracket 47. The bracket 47 is mounted on a side plate 49 of an original conveying apparatus A through a support member 48.

The light-receiving unit 42 has a structure in which a case 51 is put on a PD board 50 on which the light-receiving element 44 is mounted. The case 51 is provided with an opening 52 for the reception of light. The light-receiving unit 42 having this structure is mounted on a bracket 53. The bracket 53 is mounted on a support member 54 fixed to the side plate 49 of the apparatus so as to be slidable in the sheet widthwise direction.

The arrangement for sliding movement of the bracket 53 will be described next with reference to FIGS. 4A and 4B. A long hole 55 is formed in the bracket 53 in the sheet widthwise direction, and the bracket 53 is mounted on the support member 54 with stepped screws 56 inserted in the long hole 55. The mounting structure using the stepped screws 56 allows the bracket 53 to be easily slid along the long hole 55. As shown in FIG. 2, the bracket 53 is provided with an operation tab 59 exposed to the outside through an opening 58 of an apparatus cover 57. The user can move the bracket 53 in the sheet widthwise direction by arbitrarily operating the operation tab 59. This makes it possible to move the light-receiving element 44 of the light-receiving unit 42 to a position corresponding to one light-emitting element 43a of the light-emitting unit 41 (see FIG. 4A) and to a position corresponding to the other light-emitting element 43b (see FIG. 4B). Note that the opening 58 is provided with a lid (not shown), which allows the opening to be exposed only when the light-receiving unit 42 is to be moved.

Referring to FIG. 2, reference numeral 60 denotes a leaf spring serving as a biasing unit which biases the bracket 53 against the support member 54. The leaf spring 60 suppresses the backlash of the bracket 53 and increases the sliding load between the bracket 53 and the support member 54, thereby preventing the bracket 53 from being easily shifted from a moving position.

According to this arrangement, when, for example, an original of B5 size short in the widthwise direction is to be conveyed, the operation tab 59 of the bracket 53 is manually operated to the middle side (the upper side in FIG. 4A) of the convey path 12 in the widthwise direction to move the light-receiving unit 42 to the position corresponding to one light-emitting element 43a, and control is performed to make only the light-emitting element 43a emit light, as shown in FIG. 4A. With this operation, the lateral shift amount of the original of B5 size is detected. When, for example, an original of A4 size long in the widthwise direction is to be conveyed, the operation tab 59 of the bracket 53 is manually operated to the end portion side (the lower side in FIG. 4B) of the convey path 12 in the widthwise direction to move the light-receiving unit 42 to the position corresponding to the other light-emitting element 43b, and light emission control is performed for only the light-emitting element 43b, as shown in FIG. 4B. With this operation, the lateral shift amount of the original of A4 size is detected. Using such a control method makes it possible to accurately obtain the detection values of the shift amounts of originals of a plurality of sizes without complicating the arrangement and detection processing.

An outside guide 12a and inside guide 12b constituting the convey path 12 are provided with opening portions 12c and 12d through which light emitted from the light-emitting elements 43a and 43b passes toward the light-receiving element 44. The light passing through the opening portions 12c and 12d is limited to light corresponding to a predetermined detection area by the case 51 and received by the light-receiving element 44. In the apparatus according to this embodiment, since the convey path 12 is formed in an almost U shape, it is not easy to manually move the light-emitting elements 43a and 43b arranged inside the convey path 12. For this reason, the two light-emitting elements 43a and 43b are fixed inside the convey path 12, and the single light-receiving element 44 is movably placed outside the convey path 12.

As described above, according to the photodetector 40 in this embodiment, when one of the light-emitting elements 43a and 43b is selected in accordance with an original size, the light-receiving unit 42 must be manually moved to a corresponding position. The user may forget to move the light-receiving unit 42 in spite of the fact that the original size has been changed. If a lateral shift amount is detected without noticing it, an erroneous lateral shift amount is detected. That is, since light emitted from a light-emitting element obliquely facing the light-receiving element 44 instead of a light-emitting element squarely facing the light-receiving element 44 strikes the light-receiving element 44, an accurate lateral shift amount cannot be detected. Even if the image data is corrected on the basis of this detection value, an insufficient result is obtained. In the present embodiment, therefore, the position of the light-receiving unit 42 before image reading is specified by a unit to be described below, thereby avoiding correction based on detection at an inappropriate position of the light-emitting element 43.

Lateral shift amount detecting operation of the photodetector 40 will be described with reference to the flowchart of FIG. 5 and the control block diagram of FIG. 8. First of all, when a read start button on an operation panel 400 provided in an image reading apparatus body H is pressed and a sheet feed command is received, LED selection processing for selecting one of the light-emitting elements 43a and 43b of the light-emitting unit 41 which is to be caused to emit light is executed at the same time when the position of the light-receiving unit 42 is specified (ST10 and ST11).

Figure 6:
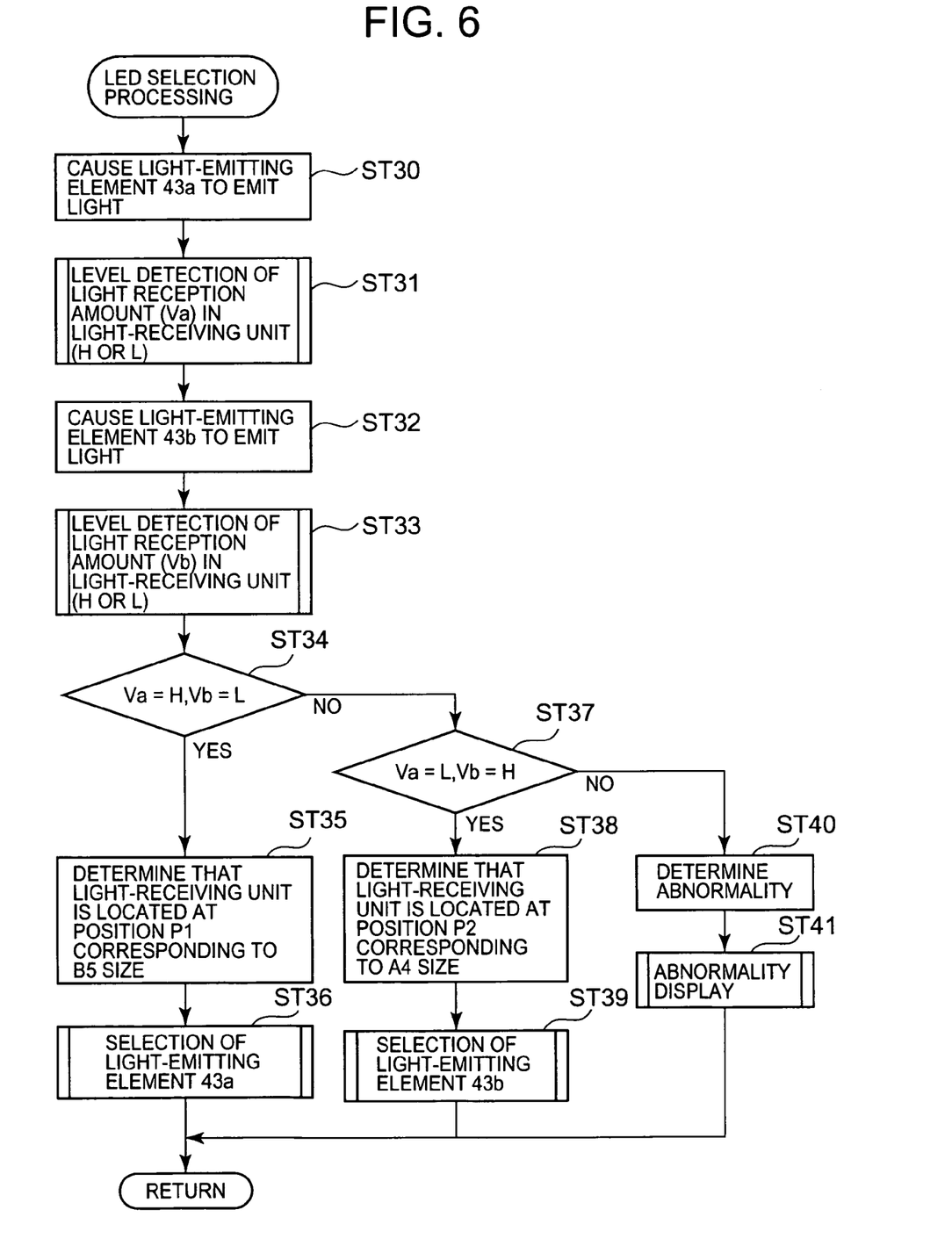
FIG. 6 is a flowchart showing part (LED selection processing) of the detection operation of the photodetector.

The above LED selection processing will be described with reference to FIG. 6. First of all, a digital signal from a CPU 310 mounted as a control device on a control unit (control board) 300 is converted into an analog signal by a D/A conversion circuit 304, and one light-emitting element 43a is energized to make it emit light (ST30). The emitted light is received by the light-receiving element 44. The light-receiving element 44 converts the light reception amount into electric energy, which is amplified by an AMP (amplifier) 307 and output. In this case, a comparison circuit 305 compares an output voltage Va with a reference level voltage Vs. If the first light reception amount Va is larger than the reference level voltage Vs, the comparison circuit 305 outputs a HIGH-level signal (H level). If the first light reception amount Va is smaller than the reference level voltage Vs, the comparison circuit 305 outputs a LOW-level signal (L level). The output from the comparison circuit is input to the CPU 310 and stored as the first position detection data, which is either H level or L level, in a RAM 301 (ST31).

When position detection data is acquired upon emission of light from one light-emitting element 43a, the emission of light from one light-emitting element 43a is stopped, and a digital signal from the CPU 310 is converted into an analog signal by a D/A conversion circuit 303, thereby performing control to cause the other light-emitting element 43b to emit light (ST32). The light reception amount of the light-receiving element 44 upon emission of light from the other light-emitting element 43b is converted into electric energy as in the case wherein one light-emitting element 43a is caused to emit light. The comparison circuit 305 then compares the voltage Vb amplified by the AMP (amplifier) 307 with the reference level voltage Vs to store, in the RAM 301, H-level or L-level data as the second position detection data (ST33) In this embodiment, the reference level voltage is set to 2.7 V, which is a value slightly smaller than the amount of light received by the light-receiving element 44 when it is located at a position corresponding to one light-emitting element 43a or the other light-emitting element 43b while no original is present.

If the first position detection data obtained when one light-emitting element 43a is caused to emit light is at H level, and the second position detection data obtained when the other light-emitting element 43b is caused to emit light is at L level, it is determined that the light-receiving unit 42 is located at a position P1 corresponding to an original of B5 size short in the widthwise direction. One light-emitting element 43a placed at the position corresponding to the original of B5 size is then selected as a lateral shift amount detection sensor, and is caused to emit light (ST34 to ST36).

If the first position detection data obtained when one light-emitting element 43a is caused to emit light is at L level, and the second position detection data obtained when the other light-emitting element 43b is caused to emit light is at H level, it is determined that the light-receiving unit 42 is located at a position P2 corresponding to an original of A4 size long in the widthwise direction. The other light-emitting element 43b placed at the position corresponding to the original of A4 size is then selected (ST37 to ST39). In this case, if the light-receiving element is located near the light-emitting element, the light reception amount becomes large, and vice versa. Therefore, the light reception amount (voltage Va) of the light-receiving element 44 upon emission of light from one light-emitting element 43a and the light reception amount (voltage Vb) of the light-receiving element 44 upon emission of light from the other light-emitting element 43b are detected, and the detection results are compared with each other, thereby specifying the position of the light-receiving element 44.

In the above embodiment, considering that the light-receiving element 44 is located at the position corresponding to one light-emitting element 43a or the position corresponding to the other light-emitting element 43b, detection result comparison is performed such that the voltage Va corresponding to the light reception amount obtained when one light-emitting element 43a is caused to emit light and the voltage Vb corresponding to the light reception amount obtained when the other light-emitting element 43b is caused to emit light are each compared with the reference level voltage to be converted into data, and the position of the light-receiving element 44 is specified by a combination of the data. Obviously, however, in an arrangement in which the position of the light-receiving element 44 is switched between only two positions, i.e., the position corresponding to one light-emitting element 43a and the position corresponding to the other light-emitting element 43b, the voltage Va corresponding to the light reception amount obtained when one light-emitting element 43a is caused to emit light may be directly compared with the voltage Vb corresponding to the light reception amount obtained when the other light-emitting element 43b is caused to emit light.

If both the first position detection data and the second position detection data are at L level or H level or at H level and H level, since the position of the light-receiving unit 42 cannot be specified, the occurrence of abnormality is determined to perform abnormality display (ST40 and ST41). In this case, the abnormality may be caused when an original jams in the convey path 12 at the position of the photodetector 40 or caused by the lack of sensitivity adjustment or failure of the photodetector 40 or the like. If the cause is an original jam, the normal state can be restored by removing the jammed original. As abnormality display, therefore, for example, the display "original jam" is preferable.

Figure 8:
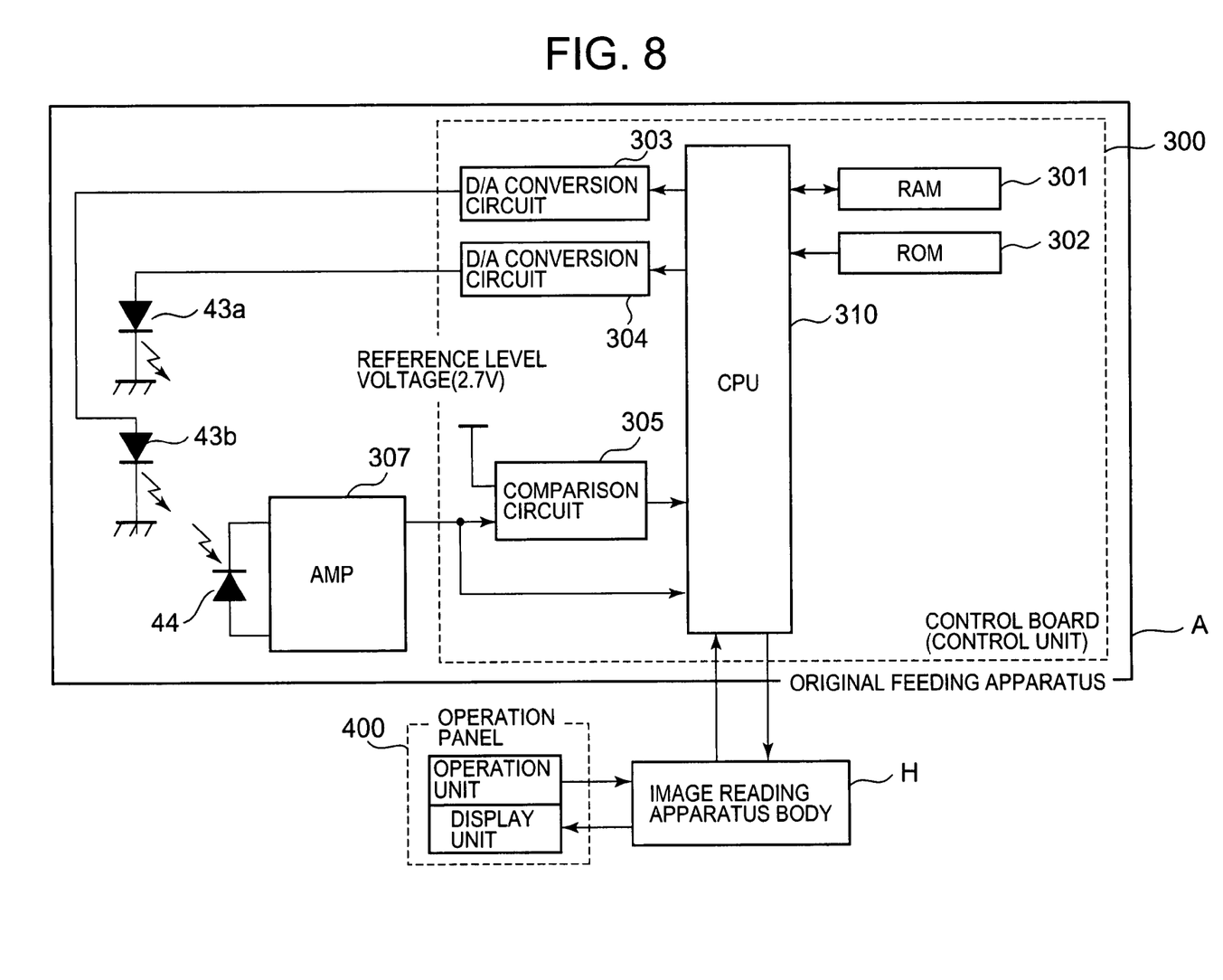
FIG. 8 is a control block diagram showing detection operation for a lateral shift amount.

The control unit 300 shown in FIG. 8 causes the CPU 310 to execute various operation programs for original convey operation, lateral shift detection operation, and the like and determination programs which are stored in a ROM 302, and drives actuators such as motors and solenoids. At the same time, the control unit 300 transmits information to the image reading apparatus H.

Figure 5:
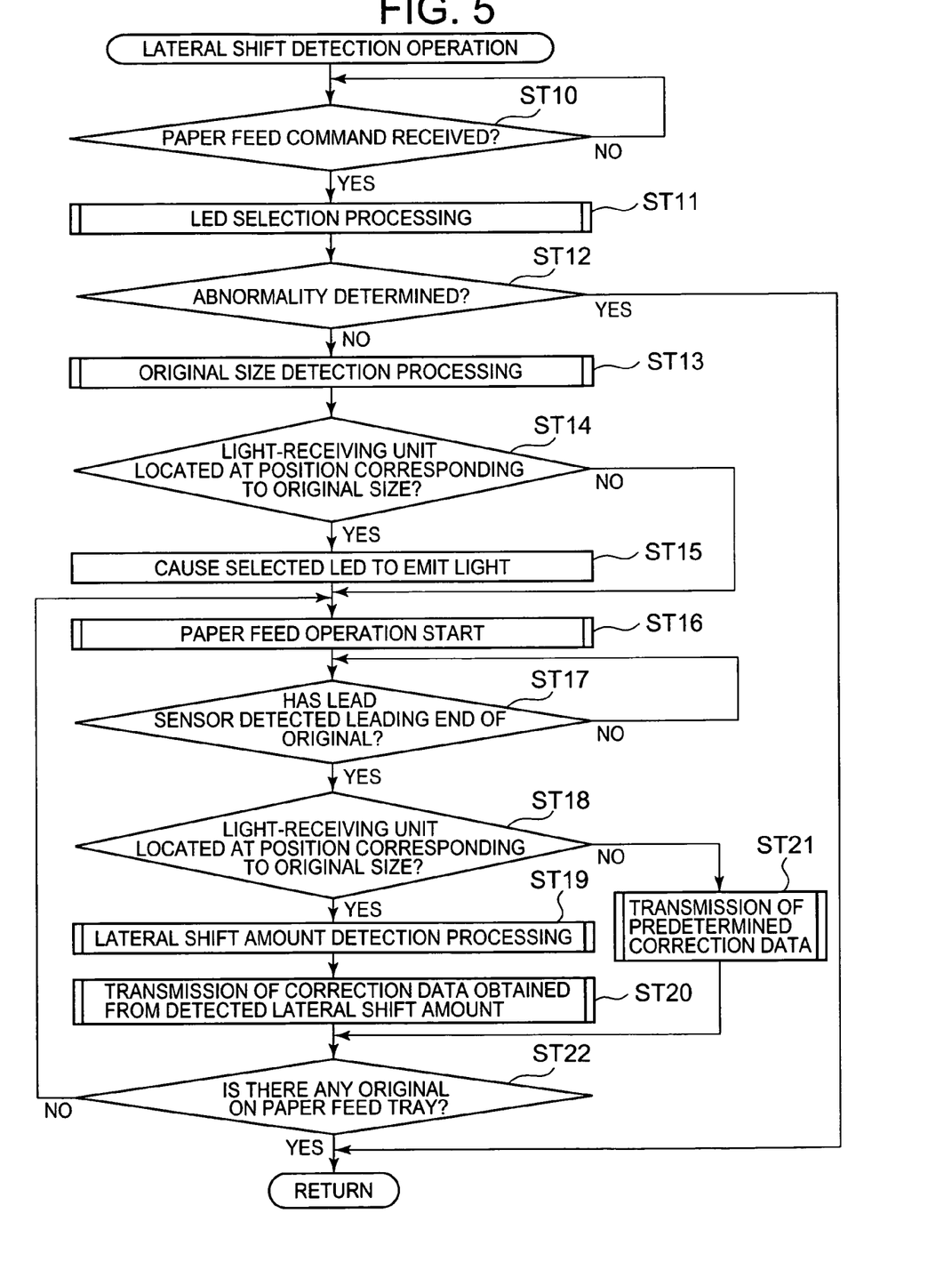
FIG. 5 is a flowchart showing the overall detection operation of the photodetector.

When the position of the light-receiving unit 42 is specified by the LED selection processing (ST11) in FIG. 5 and the light-emitting element 43a or 43b is selected as an element to be caused to emit light upon detection of a lateral shift amount in this manner, the size of the original on a sheet feed tray 10 is detected (ST13). Subsequently, lateral shift detection operation is continued. If abnormality is determined in the LED selection processing, the processing is terminated without execution of the lateral shift detection operation, and original feed operation on the sheet feed tray 10 is stopped (ST12).

Note that the above detection of the size of the original on the sheet feed tray 10 is performed such that the length of the original placed on the sheet feed tray 10 is detected by the ON/OFF states (the presence/absence detection states of an original) of a plurality of sensors S1 and S2 provided in the original feed direction of the sheet feed tray 10. In addition, the widthwise direction of the original placed on the sheet feed tray 10 is detected from a volume (not shown) whose output changes depending on the moving amount of a side guide 20, and an original size is determined on the basis of the detection result on the original width and the original length detected by the sensors S1 and S2.

As shown in FIG. 5, the position of the light-receiving unit 42 is specified, and the light-emitting element 43a or 43b is selected as an element which is to be caused to emit light. In addition, the size of the original on the sheet feed tray 10 is detected. Thereafter, it is determined whether or not the current position of the light-receiving unit 42 coincides with a position corresponding to the original size (ST14). If the light-receiving unit 42 is located at the position corresponding to the original size, the selected light-emitting element 43a or 43b is caused to emit light, and at the same time, a pickup roller 23 and a feed roller 24 are driven to start feeding the original on the sheet feed tray 10 toward a first platen glass 1 (ST15 and ST16). If the light-receiving unit 42 is not located at the position corresponding to the original size due to forgetting to move the light-receiving unit 42, sheet feed operation is started without any emission of light from either of the light-emitting elements 43a and 43b. Originals are picked up from the sheet feed tray 10 by the pickup roller 23 and one original is separated from the rest by the feed roller 24 and a separating member 25. The original is then conveyed toward the first platen glass 1.

When the leading end of the original conveyed toward the first platen glass 1 is detected by a lead sensor S4, it is checked again, regardless of whether or not the photodetector 40 is used, whether the position of the light-receiving unit 42 is at the position corresponding to the detected original size (ST17 and ST18). If it is specified that the light-receiving unit 42 is located at the position corresponding to the detected original size, a selected one of the light-emitting elements 43a and 43b has been caused to emit light. Therefore, detection of a lateral shift amount is executed in the above manner. The above correction data is then obtained from the value obtained from the detection result and transmitted to the image reading apparatus body H (ST19 and ST20).

If it is recognized that the light-receiving unit 42 is not located at the position corresponding to the detected original size, since detection of a lateral shift amount cannot be performed, the correction data stored in the ROM in advance is transmitted to the image reading apparatus body H (ST21). The correction data stored in the ROM is, for example, the correction data obtained on the basis of the lateral shift amount of the original which is obtained for each size in advance by experiments.

When correction data for correcting image data is transmitted to the image reading apparatus body H, the presence/absence of an original on the sheet feed tray 10 is detected by an empty sensor S3 (ST2). If the next original is detected, sheet feed operation is started again, and detection of the lateral shift amount of the next original is executed. If no next original is detected, the operation is terminated.

Figure 7:
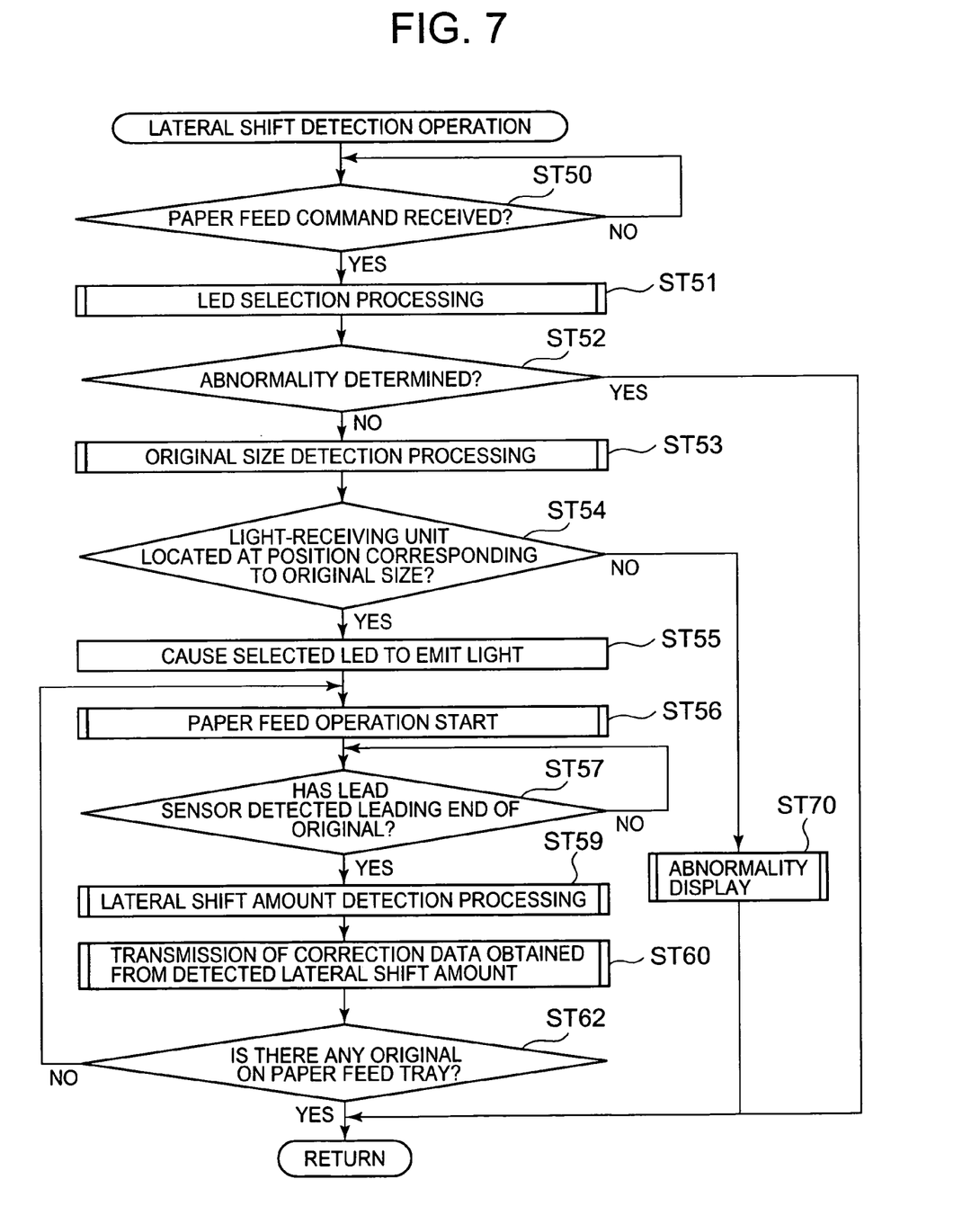
FIG. 7 is a flowchart showing another processing unit to be used when it is recognized that the light-receiving unit is at an inappropriate position.

In the above embodiment, if the position of the light-receiving unit 42 which is detected in LED selection processing does not coincide with the position corresponding to the size of the original on the sheet feed tray 10, the correction data stored in the ROM in advance is transmitted to the image reading apparatus body H. However, as shown in FIG. 7, when it is determined that the position of the light-receiving unit 42 is not appropriate (ST54), abnormality is displayed (ST70), and the subsequent processing may be terminated. Note that as abnormal display at this time, a warning device for warning the operator is preferably used, e.g., generating a warning sound or displaying "The position of the light-receiving unit is not appropriate. Please move it to the appropriate position."

Note that the processing in steps ST50 to ST53 in FIG. 7 is the same as that in steps ST10 to ST13 in this embodiment. The processing in step ST55 and the subsequent steps is the same as that in the above embodiment except that after it is determined that the light-receiving unit 42 in the above embodiment is not at the position corresponding to a detected original size (ST18), the correction data stored in the ROM is not used. Therefore, a detailed description of this processing will be omitted.

The above embodiment has exemplified the case wherein the photodetector 40 is applied to the automatic original feeding apparatus provided in the image reading apparatus. Obviously, however, the photodetector 40 can be applied to various apparatuses designed to convey sheets.

According to the sheet conveying apparatus of the present invention, even if conveyed sheets differ in size in the widthwise direction, the positional shift amount of each conveyed sheet in the widthwise direction can be accurately detected.

In addition, according to the image reading apparatus of the present invention, even if sheets conveyed to a reading position differ in size, accurate positional shift amounts can be detected in accordance with the respective sheet sizes, thereby improving the correction precision of image data.

What is claimed is:

1. A sheet conveying apparatus comprising:
    a sheet feed tray on which sheets of a plurality of sizes which differ in length in a sheet widthwise direction perpendicular to a sheet conveying direction;

a conveying unit which conveys a sheet on the sheet feed tray to a predetermined processing position;

a sheet position detector, which has a plurality of light-emitting units respectively arranged at positions corresponding to different sheet widths perpendicular to the sheet conveying direction and one light-receiving unit capable of moving to positions corresponding to the plurality of light-emitting units, provided between the sheet feed tray and the predetermined processing position;

a light reception position detector which detects a position of the light-receiving unit; and a control unit which selects one of the plurality of light-emitting units on the basis of a detection result from the light reception position detector, wherein the sheet position detector causes the selected light-emitting unit to emit light and detects a convey position of an end portion of a sheet in the widthwise direction which is conveyed by the conveying unit on the basis of an output signal from the light-receiving unit when the light-emitting unit is caused to emit light.

2. An apparatus according to claim 1, wherein a convey path extending from the sheet feed tray to a delivery tray through the reading position is formed in a substantially U shape, a plurality of light-emitting elements as the plurality of light-emitting units are arranged inside the convey path in the substantially U shape, and a light-receiving element as the light-receiving unit is placed outside the convey path in the substantially U shape.

3. An apparatus according to claim 1, further comprising a sheet size detector which detects a size of a sheet conveyed by the conveying unit, wherein the control unit determines, on the basis of a detection result from the sheet size detector and a detection result from the reception light position detector, whether or not to execute detection by the sheet position detector.

4. An apparatus according to claim 1, further comprising a sheet size detector which detects a size of a sheet conveyed by the conveying unit, wherein the control unit determines whether or not the light-receiving unit is located at a position corresponding to the sheet size detected by the sheet size detector, causes the sheet position detector to detect a convey position of the sheet, when determining that the light-receiving unit is located at the position corresponding to the sheet size, and displays abnormality when determining that the light-receiving unit is not located at the position corresponding to the sheet size.

5. A sheet conveying apparatus comprising:
a sheet feed tray on which a sheet is placed;
a conveying unit which conveys a sheet on the sheet feed tray to a predetermined processing position;
a sheet position detector, which is provided between the sheet feed tray and the predetermined processing position, having a plurality of light-emitting units respectively arranged at positions corresponding to different sheet widths perpendicular to the sheet conveying direction and one light-receiving unit capable of moving to positions corresponding to the plurality of light-emitting units, and detecting a convey position of an end portion of a sheet in a widthwise direction which is conveyed by the conveying unit; and a light reception position detector which detects a position of the light-receiving unit on the basis of an output from the light-receiving unit when each of the plurality of light-emitting units is caused to emit light.

6. An apparatus according to claim 5, wherein the light reception position detector compares output values from the light-receiving unit when the plurality of light-emitting units are caused to emit light, and specifies a position of the light-receiving unit from a comparison result.

7. An apparatus according to claim 5, wherein the light reception position detector compares an output value from the light-receiving unit when each of the plurality of light-emitting units is caused to emit light with a preset reference value, and specifies a position of the light-receiving unit on the basis of obtained data.

8. An image reading apparatus comprising:
a sheet conveying apparatus defined in claim 1;
a reading unit which reads an image on a sheet conveyed by the conveying unit at the processing position; and
a correcting unit which corrects image data in accordance with a sheet position detected by the sheet position detector.

9. An apparatus according to claim 8, wherein the correcting unit changes a read start of image data read by the reading unit and stored in a storage unit.

10. An apparatus according to claim 8, wherein the correcting unit changes a read start position of the reading unit in a main scanning direction.

11. An image reading apparatus comprising:
a sheet conveying apparatus defined in claim 5;
a reading unit which reads an image on a sheet conveyed by the conveying unit at the processing position; and
a correcting unit which corrects image data in accordance with a sheet position detected by the sheet position detector.

12. An apparatus according to claim 11, wherein the correcting unit changes a read start of image data read by the reading unit and stored in a storage unit.

13. An apparatus according to claim 11, wherein the correcting unit changes a read start position of the reading unit in a main scanning direction.

* * * * *